United States Patent
Hanko et al.

(10) Patent No.: US 6,512,467 B1
(45) Date of Patent: Jan. 28, 2003

(54) METHOD AND APPARATUS FOR DYNAMICALLY CONFIGURING DEVICE USING DEVICE CODE

(75) Inventors: James G. Hanko, Redwood City, CA (US); Alan Ruberg, Foster City, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/289,266

(22) Filed: Apr. 9, 1999

(51) Int. Cl.[7] .............................................. H03K 17/94
(52) U.S. Cl. ............................ 341/22; 341/28; 710/8; 713/1; 713/100
(58) Field of Search .......................... 341/22, 23, 28; 400/484, 110; 345/171; 704/8; 710/8, 10, 63, 64, 73, 104; 713/1, 2, 100

(56) References Cited

U.S. PATENT DOCUMENTS 4,456,972 A * 6/1984 Lee et al. .................... 345/169
5,631,643 A * 5/1997 Hisamori et al. ............. 341/23
5,655,148 A * 8/1997 Richman et al. ............. 710/8
5,781,795 A * 7/1998 Izuta ............................ 710/8

* cited by examiner

Primary Examiner—Timothy Edwards, Jr.
(74) Attorney, Agent, or Firm—O'Melveny & Myers LLP (57) ABSTRACT

The invention is a method and apparatus for configuring a first device based on a code associated with a second device. In accordance an embodiment of the invention, the method comprises the steps of accepting with the first device an input from the second device, providing to the first device a code associated with the second device in association with the input, determining if a configuration of the first device corresponds to a configuration corresponding to the provided code and, if not, reconfiguring the first device to a configuration associated with the provided code if the first device. In one embodiment of the invention, the first device is a computer and the second device is a keyboard connected to the computer, the input comprises the typing of a key and the configuration comprises selecting a keyboard mapping function corresponding to a keyboard code.

20 Claims, 5 Drawing Sheets

METHOD AND APPARATUS FOR DYNAMICALLY CONFIGURING DEVICE USING DEVICE CODE

BACKGROUND OF THE INVENTION

1. Field of the Invention

This invention is in the field of computer devices and relates to a method and apparatus for dynamically configuring a computer device using a device code.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun Microsystems, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background Art

One goal of many of today's product manufacturers is to make their products user-friendly to users who read and write a variety of different languages. This is true of computer hardware and software manufacturers.

As one means of rendering a computer usable by users who read and write different languages, different keyboards may be associated with a computer which are specially arranged or adapted to permit the user to type in a specific language. For example, one keyboard may have keys corresponding to the letters of the English alphabet. Another keyboard may have keys corresponding to Russian, French, German or other languages. Of course, the computer must be arranged so that when a user uses a particular keyboard, the symbols associated with the keys on the keyboard are correspondingly displayed on the computer.

Keyboards, however, are not generally arranged to send data to a computer which represents the particular symbol associated with a typed key. Instead, the keyboard sends a code to the computer indicating the particular key which was depressed. This information is generally in the form of a location code. The computer is provided with keyboard maps for a variety of keyboard layouts. The computer utilizes a map to translate the location code of a typed key into a symbol which corresponds to that location. As may be appreciated, if the computer is using a map which does not correspond to the correct keyboard, the symbols which the computer indicates are associated with the typed keys may be erroneous as compared to the symbols which are actually associated with the keys of a particular keyboard.

In a common arrangement, when a user connects a particular keyboard to a computer, the user may access software for selecting the particular "map" corresponding to the keyboard which the user is connecting. For example, the operating system Windows 98™ includes a feature by which a user may select one map for an English-language keyboard, another for a Russian-language keyboard, and yet others for languages such as Swedish and German.

This above-described arrangement requiring the user to configure the computer to ensure that the map the computer is using corresponds to the keyboard which the user is using has several disadvantages. One problem is that this arrangement requires the user to identify what particular keyboard is being used. A user might accidentally select a keyboard for one particular English dialect instead of another, and not recognizing this, not successfully reconfigure the computer to match.

Another problem is that the user may not be able to communicate with the computer in a manner which permits selection of a new configuration. For example, a user who reads and writes Russian may use a Russian language keyboard with a computer configured to display text and other information in Russian. A user who speaks and writes only English then wishes to use the same computer may connect an English language keyboard to the computer. When the user wishes to change the configuration of the computer to match the new keyboard, however, the menus and other displayed information may be presented in Russian, making it extremely difficult for the user to reconfigure the computer.

This arrangement also has the disadvantage that the user may need to use the newly connected keyboard to reconfigure the computer. Until the computer is configured with the correct map, however, the user's keystrokes on the keyboard will not necessarily yield the desired results.

SUMMARY OF THE INVENTION

The invention is a method and apparatus for configuring a first device based on a code associated with a second device.

In accordance an embodiment of the invention, the method comprises the steps of providing a signal from the second device to the first device an input from the second device, providing to the first device a code associated with the second device in association with the input, determining if a configuration of the first device corresponds to a configuration corresponding to the provided code and, if not, reconfiguring the first device to a configuration associated with the provided code if the first device.

In one embodiment of the invention, the first device is a computer, the second device is a keyboard connected to the computer, the input comprises the typing of a key and the configuration step comprises selecting a keyboard mapping function corresponding to a keyboard code.

In one or more embodiments, computer hardware and/or software is arranged to perform the method of the invention. Further objects, features and advantages of the invention will become apparent from the detailed description of the drawings which follows, when considered with the attached figures.

DETAILED DESCRIPTION OF THE INVENTION

The invention is a method and apparatus for dynamically configuring a first device or element using a device code associated with a second device or element. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Method of Dynamic Internalization Using Device Code

One embodiment of the invention comprises a method for dynamically configuring a first device or element using a device code associated with a second device or element. In one or more embodiments, the invention is a method by which a first device, such as a computer, is configured based on a code associated with a second device, such as a keyboard. This method will be described with reference to FIG. 3.

Figure 3:
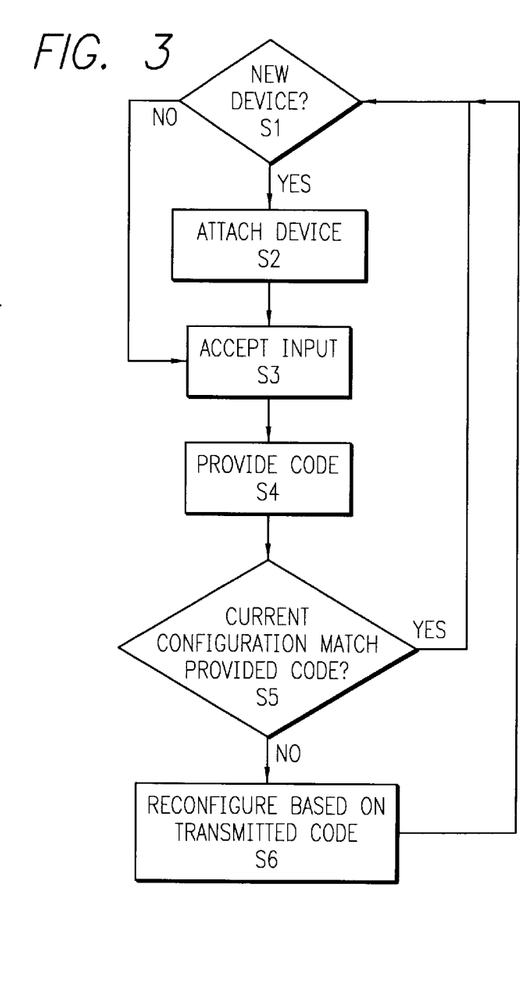
FIG. 3 is a flow diagram illustrating the operation of the present invention.

In a first step S1 of the method, a determination is made as to whether a new device is present. If yes, at step S2, the new device, such as a keyboard, is coupled to a computer. After step S2, or if there is no new device at decision block S1, at step S3, an input to the second device is accepted. In one or more embodiments, the input is a key event associated with a keyboard of a computer. By "key event" it is meant the activation, such as by depression, of a key or other input device associated with the keyboard.

At a step S4, a code associated with the second device is provided to the first device. In one or more embodiments of the invention, the code comprises information which identifies a characteristic of the first device, such as the arrangement of a keyboard. For example, the code may identify the language or country to which the keyboard corresponds. Such codes are well known to those of skill in the art.

The code may be provided by the keyboard or other second device in a wide variety of manners. In one or more embodiments, the code is automatically transmitted from the keyboard or other second device to the first device to be configured each time a key is activated. In one or more embodiments, the code is transmitted with the key code indicating which key was activated on the keyboard. The computer or other first device to be configured may also be arranged to seek the information from the keyboard or other second device, such as in response to the transmission of a depressed key code.

At a step S5, it is determined if the current configuration of the computer or other first device is the same as the configuration which is associated with the provided code. For example, if a computer is configured for mapping input from a Russian-language keyboard and this configuration corresponds to a code of 5, this configuration (i.e. "code 5") is compared to the code transmitted from the keyboard, such as "8" for an English-language keyboard.

If the computer or other first device is not configured in a manner which corresponds to the provided code, then the computer is reconfigured at step S6. If the computer is already configured correctly at decision block S5, or after the computer has been reconfigured at step S6, the system returns to decison block S1.

In one or more embodiments, reconfiguration of the computer comprises selecting a keyboard mapping function which corresponds to the keyboard which provided the code. As an example, in this arrangement, when a user types a Russian letter for display, that letter is displayed on the computer.

Configuration Protocol

In one or more embodiments of the invention, the configuration of the first device to match the configuration associated with the provided code is prospective only. In other words only those events and occurrence after or subsequent to the reconfiguration are affected. Consider where text is typed into a computer with an English-language keyboard and displayed in English. When a user connects a Russian-language keyboard and inputs text, the display continues to show the existing text in English, but displays any new text that is typed on the Russian-language keyboard in Russian. An example of this is illustrated in FIG. 5.

Figure 5:
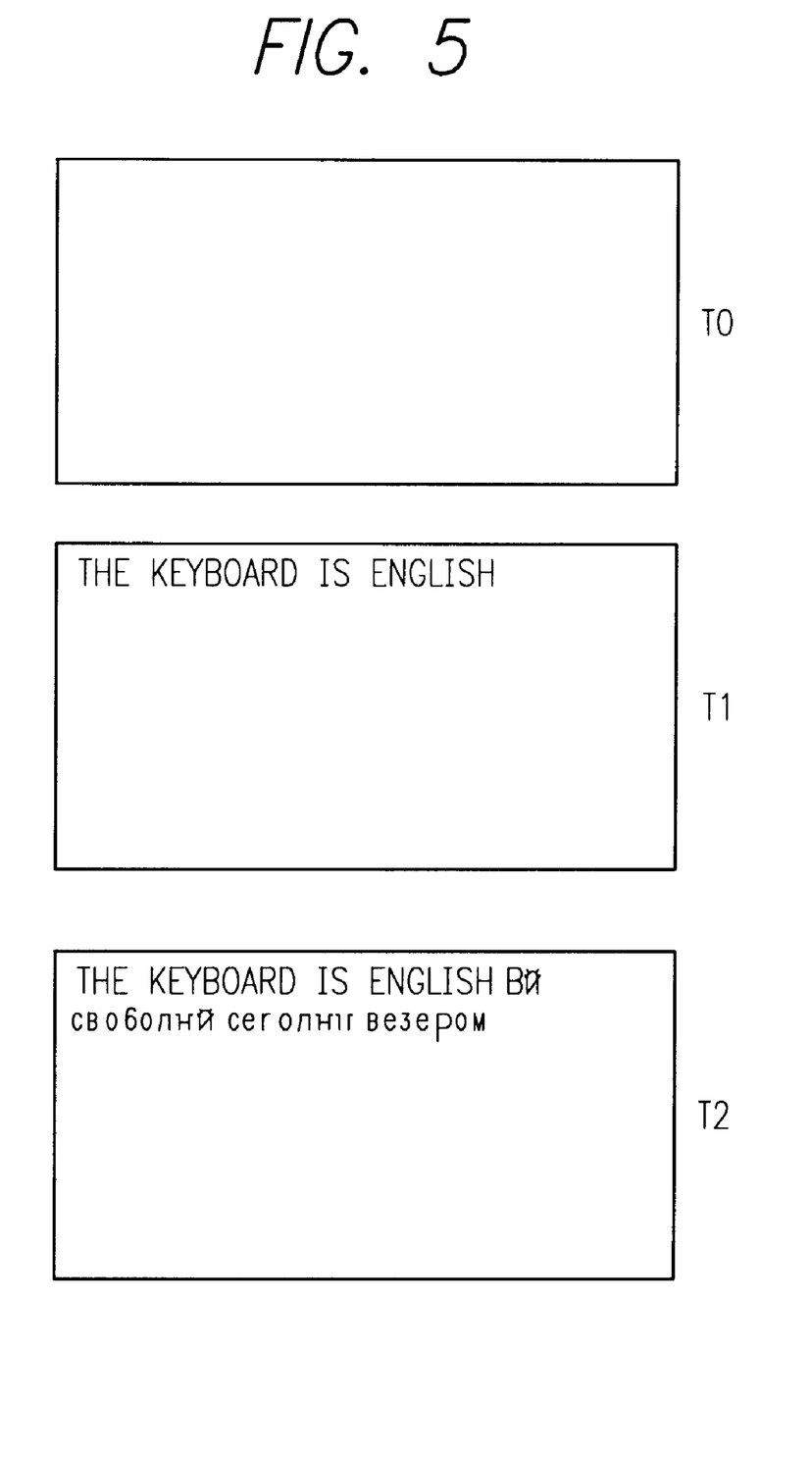
FIG. 5 illustrates a display in one embodiment of the present invention.

Referring to FIG. 5, at time T0, a user, using an English language keyboard, has typed a sentence "The keyboard is English". At time T1 the keyboard has been switched to a Russian keyboard. As the user continues typing, the letters now typed appear in Russian, but the prior text remains in English.

In one or more embodiments, the reconfiguration of the computer be arranged to change information and data associated with events both prior and subsequent to the input event which triggers the reconfiguration. For example, in response to a new language code from a newly connected keyboard, text or other information previously input in accordance with a previous configuration (such as in English) may be converted to match the new configuration.

Figure 6:
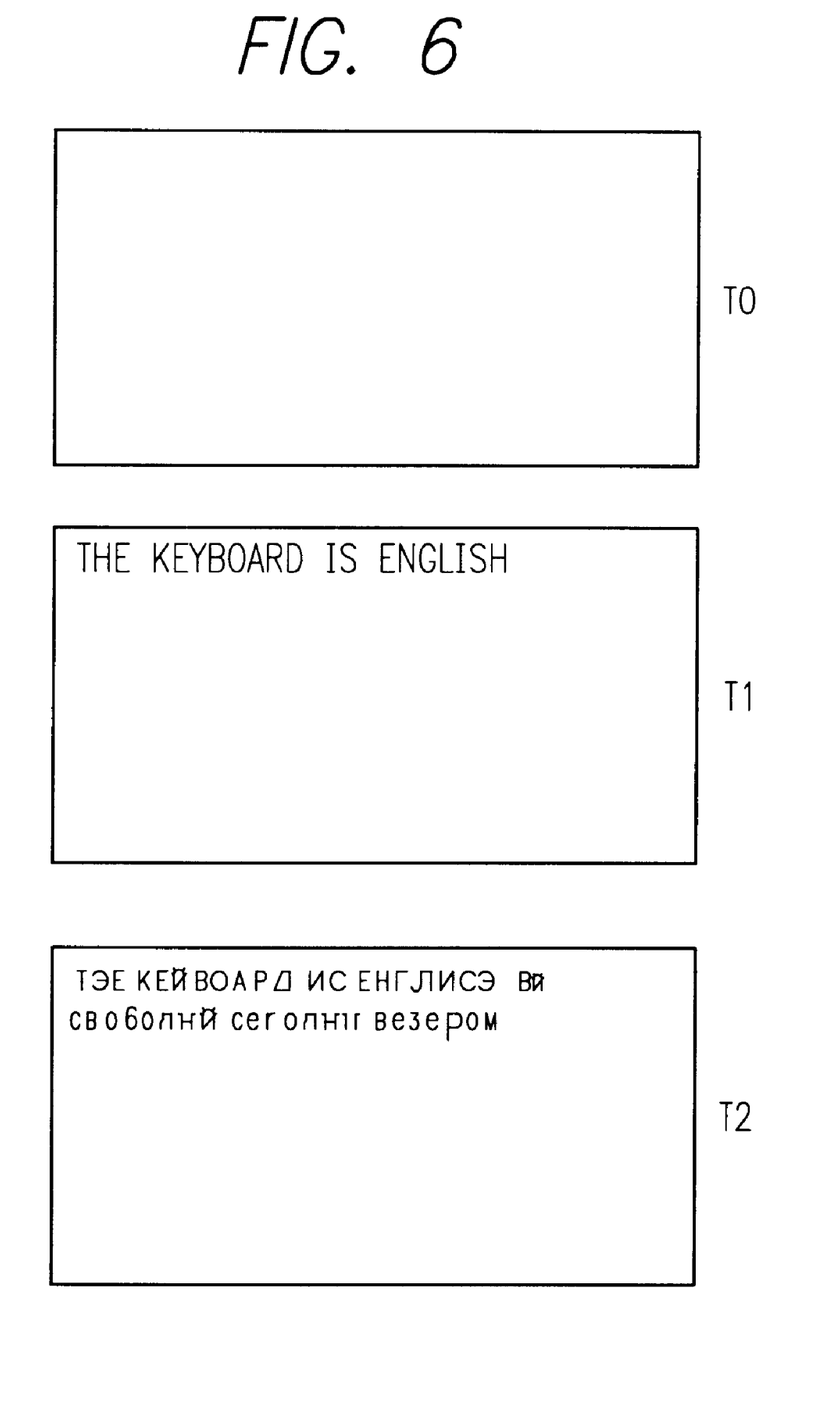
FIG. 6 illustrates a display in another embodiment of the present invention.

Referring to FIG. 6, at time T0, a user, using an English language keyboard, has typed a sentence "The keyboard is English". At time T1 the keyboard has been switched to a Russian keyboard. As soon as the user continues typing, the new letters typed appear in Russian, and the letters of the prior text are converted to the Cyrillic (Russian) equivalent.

The computer may be arranged to reconfigure menus and other information to display in the new language or other configuration which matches new code.

Environment

As described in more detail below, the invention has application to a variety of devices and systems having at least one first device and at least one second device. One example of a computer system architecture or system with which the invention is applicable in FIG. 1. In this system, the at least one first device comprises a central data source and the at least one second device comprises a "Human Interface Device" (HID). As described in more detail below, in this architecture, some or all computing is done by the central data source or service, with the output of the data source provided to a HID. The HID is capable of receiving data and displaying data.

Figure 1:
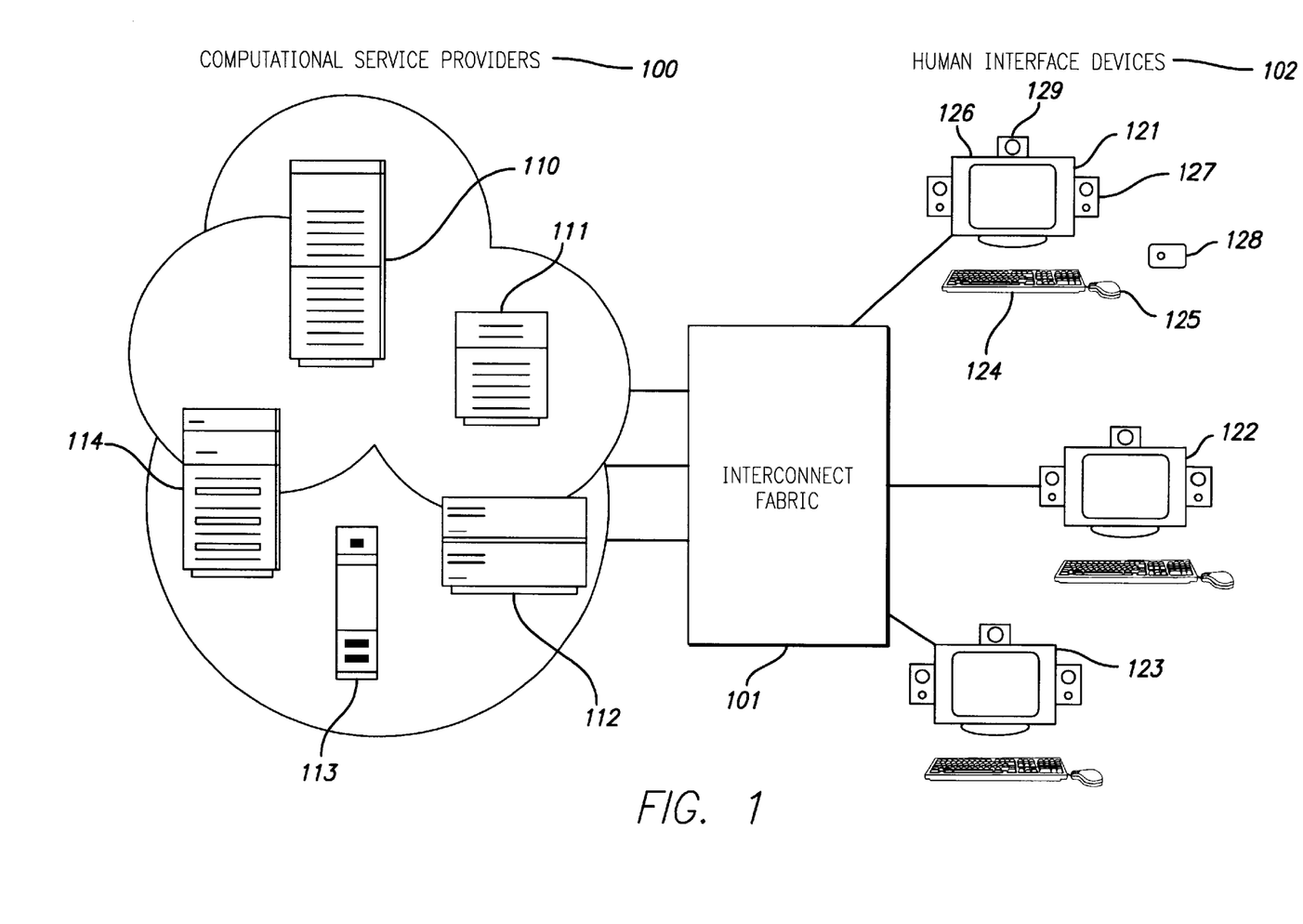
FIG. 1 is an example of an environment for use with the present invention.

In the system illustrated in FIG. 1, the central data source comprises one or more computational service providers or servers 100. The one or more service providers 100 communicate with one or more HIDs through some interconnect fabric 101, such as a network.

In this arrangement, the computational power and state maintenance is found in the service providers. The services are not tied to a specific computer, but may be distributed over one or more traditional desktop systems such as the computer device described in connection with FIG. 4 below. One computer may have one or more services, or a service may be implemented by one or more computers. The service provides computation, state, and data to the HIDs and the service is under the control of a common authority or manager. In FIG. 1, the services are found on computers 110, 111, 112, 113 and 114. The central data source can also be providing data that comes from outside of the central data source, such as for example, the Internet or world wide web.

It is the responsibility of the service to handle communications with the HID that is currently being used to access the given service. This involves taking the output from the computational service and converting it to an acceptable protocol for the HID.

The interconnect fabric is any of multiple suitable communication paths for carrying data between the services and the HIDs. In one embodiment the interconnect fabric is a local area network implemented as an Ethernet network. Any other local network may also be utilized, as well as the Internet, the world wide web or others.

In one embodiment, the interconnect fabric provides actively managed, low-latency, high bandwidth communications between the HID and the services being accessed.

The HID is the means by which users access computational services provided by the servers or services, and as such the HID may also be referred to as a client or user workstation or terminal. FIG. 1 illustrates HIDs 121, 122 and 123. In the embodiment illustrated, a HID consists of a display 126, a keyboard 124, a mouse 125, and audio speakers 127. The HID includes the electronics needed to interface these devices to the interconnection fabric and to transmit and receive data from the services.

Figure 2:
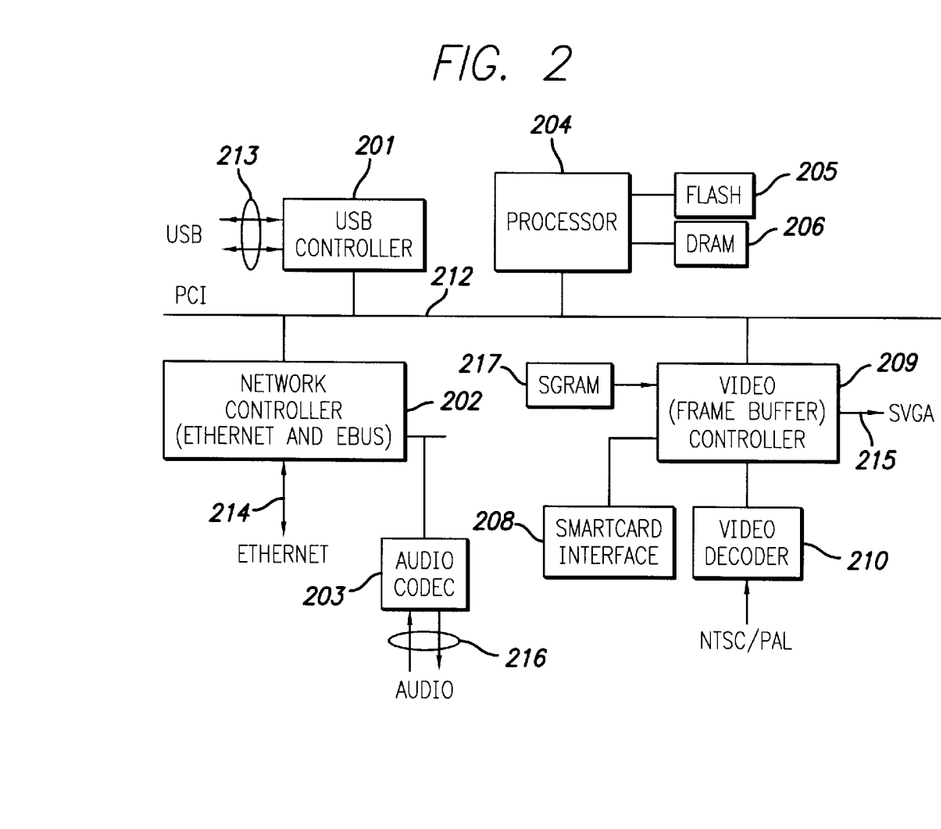
FIG. 2 illustrates a block diagram of one embodiment of an HID.

A block diagram of one embodiment of a HID is illustrated in FIG. 2. The components of the HID are coupled internally to a PCI bus 212. A network control block 202 communicates with the interconnect fabric, such as an Ethernet, through line 214. An audio codec 203 receives audio data on interface 216 and is coupled to block 202. USB data communication is provided on lines 213 to USB controller 201.

An embedded processor 204 may be, for example, a Sparc2ep with coupled flash memory 205 and DRAM 206. The USB controller 201, network controller 202 and embedded processor 204 are all coupled to the PCI bus 212. Also coupled to the PCI 212 is the video controller 209. The video controller 209 may be for example, an ATI Rage128 frame buffer controller (or any other suitable controller) that provides SVGA output on line 215. NTSC or PAL data is provided into the video controller through video decoder 210. A smartcard interface 208 may also be coupled to the video controller 209.

Alternatively, the HID can be implemented using a single chip solution including the necessary processing capability.

This architecture or system is described in greater detail in U.S. patent application Ser. No. 09/063,335, assigned to the present assignee, filed Apr. 20, 1998, entitled "Method and Apparatus For Providing A Virtual Desktop System Architecture" incorporated herein by reference.

The method described above has many advantages when applied to a system such as that described above. In the system described above, a user may move between HIDs 102. One HID may have an attached Russian-language keyboard 124, and another an English-language keyboard. In the system described above, the system is arranged to "remember" user-settings, such as by use of a smartcard associated with the interface 208. In this arrangement, if a user first accesses the system with the HID having the connected English-language keyboard 124, when a user moves to another HID, the system will associate as one setting for the user that the user is inputting data from an English-language keyboard, even if such is not the case. In accordance with the present invention, when the user moves to another HID, such as the one having the Russian-language keyboard 124, the computer (in this case a service 110,111 etc.) will automatically be reconfigured at the time of the first key input to match the keyboard change.

As stated above, the invention has applicability to a wide range of devices other than just the system described above. For example, the invention is applicable to general purpose computer 400 such as that illustrated in FIG. 4.

Thus, an embodiment of the invention can be implemented as computer software in the form of computer readable code executed on computer 400 or other device, or in the form of bytecode class files executable within a Java™ runtime environment running on such a computer or other device, or in the form of bytecodes running on a processor (or devices enabled to process bytecodes) existing in a distributed environment (e.g., one or more processors on a network such as the system described above).

Figure 4:
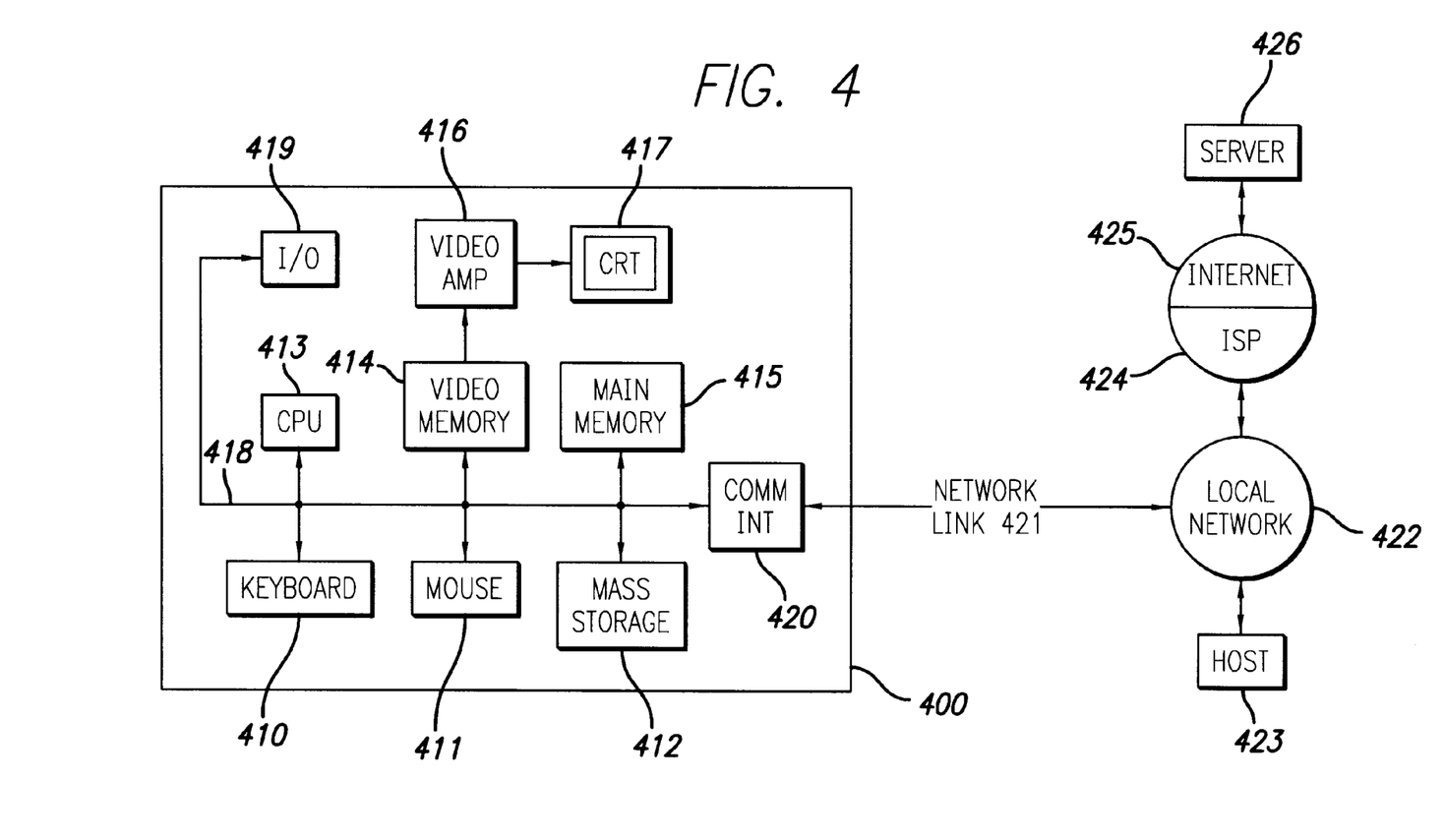
FIG. 4 is a block diagram of a computer system for use with the present invention.

Referring to FIG. 4, the computer 400 includes a keyboard 410 and mouse 411 (or other pointing device) coupled to a system bus 418. The keyboard and mouse are for introducing user input to the computer system and communicating that user input to processor 413. Other suitable input devices may be used in addition to, or in place of, the mouse 411 and keyboard 410. I/O (input/output) unit 419 coupled to system bus 418 represents such I/O elements as a printer, A/V (audio/video) I/O, etc.

Computer 400 includes a video memory 414, main memory 415 and optional mass storage 412, all coupled to system bus 418 along with keyboard 410, mouse 411 and processor 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 64-bit data bus for transferring data between and among the components, such as processor 413, main memory 415, video memory 414 and mass storage 412. Alternatively, multiplex data/address lines may be used instead of separate data and address lines.

In one embodiment of the invention, the processor 413 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor or display 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

Computer 400 may also include a communication interface 420 coupled to bus 418. Communication interface 420 provides a two-way data communication coupling via a network link 421 to a local network 422. For example, if communication interface 420 is an integrated services digital network (ISDN) card or a modem, communication interface 420 provides a data communication connection to the corresponding type of telephone line, which comprises part of network link 421. If communication interface 420 is a local area network (LAN) card, communication interface 420 provides a data communication connection via network link 421 to a compatible LAN. Wireless links are also possible. In any such implementation, communication interface 420 sends and receives electrical, electromagnetic or optical signals which carry digital data streams representing various types of information.

Network link 421 typically provides data communication through one or more networks to other data devices. For example, network link 421 may provide a connection through local network 422 to local server computer 423 or to data equipment operated by an Internet Service Provider (ISP) 424. ISP 424 in turn provides data communication services through the world wide packet data communication network now commonly referred to as the "Internet" 425. Local network 422 and Internet 425 both use electrical, electromagnetic or optical signals which carry digital data streams. The signals through the various networks and the signals on network link 421 and through communication interface 420, which carry the digital data to and from computer 400, are exemplary forms of carrier waves transporting the information.

Computer 400 can send messages and receive data, including program code, through the network(s), network link 421, and communication interface 420. In the Internet example, remote server computer 426 might transmit a requested code for an application program through Internet 425, ISP 424, local network 422 and communication interface 420.

The received code may be executed by processor 413 as it is received, and/or stored in mass storage 412, or other non-volatile storage for later execution. In this manner, computer 400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems and devices described above are for purposes of example only. An embodiment of the invention may be implemented in any type of computer system or programming or processing environment.

As will be appreciated by those of skill in the art, there are a wide variety of configurations for hardware and software for accomplishing the method of the invention other than that described above.

Of course, the foregoing description is that of preferred embodiments of the invention, and various changes and modifications may be made without departing from the spirit and scope of the invention, as defined by the claims.

What is claimed is:

1. A method of configuring a server based on a code provided by a Human Interface Device (HID) comprising the steps of:
    connecting said server to said HID via an interconnect fabric;
    accepting by said server an input from said HID;
    providing a code associated with a peripheral device connected with said HID to said server in association with said input;
    determining if a configuration of said server corresponds to a configuration corresponding to said provided code; and
    dynamically reconfiguring said server to a new configuration associated with said provided code if said server is not already configured in accordance with said provided code.

2. The method in accordance with claim 1 wherein said reconfiguration step is prospective.

3. The method in accordance with claim 1 wherein said reconfiguration step comprises reconfiguring previously entered information in accordance with a prior configuration to match said new configuration.

4. The method in accordance with claim 1 further comprising:
    associating a user using said peripheral device with said new configuration;
    reconfiguring said server with said new configuration associated with said user when said user moves to a second HID;
    accepting by said server a second input from said second HID;
    providing a second code associated with a second peripheral device connected with said second HID to said server in association with said second input;
    determining if said new configuration of said server corresponds to a configuration corresponding to said provided second code; and
    dynamically reconfiguring said server to a second new configuration associated with said provided second code if said server is not already configured in accordance with said provided second code.

5. The method in accordance with claim 1 wherein said peripheral device is a keyboard and wherein said input comprises a key input associated with said keyboard.

6. The method in accordance with claim 1 wherein said step of providing said code comprises transmitting said code with a keyboard code associated with a key of a keyboard depressed during said input step.

7. The method in accordance with claim 1 wherein said code comprises a code indicating a country associated with a keyboard.

8. The method in accordance with claim 1 wherein said code comprises a code indicating a language associated with a keyboard.

9. The method in accordance with claim 8 wherein said reconfiguration step comprises changing text information displayed by said HID into said language.

10. The method in accordance with claim 1 wherein said server provides a computational service to said HID, said HID receives and displays data from said server, and said peripheral device comprises a keyboard for entering data to said server via said HID.

11. The method in accordance with claim 10 wherein said interconnect fabric comprises a local area network.

12. The method in accordance with claim 11 further comprising:
    associating a user using said keyboard with said new configuration; and
    reconfiguring said server with said new configuration associated with said user when said user moves to a second HID connected with said server via said local area network.

13. A computing system comprising:
    a network;
    a server;
    a Human Interface Device (HID) connected to said server via said network; and
    a computer usable medium having computer readable program code embodied therein for configuring said server based on a code provided by a peripheral device connected to said HID comprising:
        computer readable program code configured to cause said server to accept a code associated with an input from said peripheral device to said HID;
        computer readable program code configured to cause said server to determine if a configuration of said server corresponds to a configuration corresponding to said associated code; and computer readable program code configured to dynamically reconfigure said server to a configuration associated with said associated code if said server is not already configured in accordance with said associated code.

14. The computing system in accordance with claim 13 wherein said code associated with an input from said peripheral device to said HID comprises an arrangement of a keyboard.

15. The computing system in accordance with claim 13 wherein said code associated with an input from said peripheral device to said HID comprises a keyboard code.

16. The computing system in accordance with claim 13 wherein said computer readable program code is further configured to change a language of displayed text provided from said server to said HID in accordance with said reconfiguration.

17. A computing system comprising:

first and second Human Interface Devices (HID's) for receiving data and displaying data;

a network connected to said first and second HID's;

means for providing computational services to said HID's via said network, wherein said providing means is physically separated from said HID's;

an input device associated with said first HID;

a transmitting device for automatically transmitting to said providing means a code corresponding to a characteristic of said input device in association with each input from a user to said input device; and means for dynamically configuring said computing system to a configuration corresponding to said code.

18. The computing system in accordance with claim 17 further comprising:

means for associating said user with said configuration when said user moves to said second HID.

19. The computing system in accordance with claim 17 wherein said input device comprises a keyboard and wherein said code comprises information indicating a language.

20. The computing system in accordance with claim 17 wherein said network comprises an Ethernet and wherein said HID's and said processing means are connected via said Ethernet.

* * * * *